(12) United States Patent
Nolfi et al.

(10) Patent No.: US 8,967,203 B2
(45) Date of Patent: Mar. 3, 2015

(54) FOREIGN MATERIAL EXCLUSION DEVICE

(71) Applicant: Advanced F.M.E. Products, Inc., Mentor, OH (US)

(72) Inventors: Thomas J. Nolfi, Chardon, OH (US); Mario M. Nolfi, Willoughby, OH (US)

(73) Assignee: Advanced F.M.E. Products, Inc., Mentor, OH (US)

( * ) Notice: Subject to any disclaimer, the term of this patent is extended or adjusted under 35 U.S.C. 154(b) by 0 days.

(21) Appl. No.: 13/835,886

(22) Filed: Mar. 15, 2013

(65) Prior Publication Data

US 2014/0261831 A1    Sep. 18, 2014

(51) Int. Cl.
F16L 55/10    (2006.01)
F16L 55/105    (2006.01)

(52) U.S. Cl.
CPC .............. *F16L 55/105* (2013.01); *Y10S 220/19* (2013.01)
USPC ............... 138/89; 138/104; 138/90; 215/335; 220/789; 220/801; 220/DIG. 19

(58) Field of Classification Search
USPC .............. 138/89, 90, 104; 215/230, 355, 364; 220/DIG. 19, 789, 801
See application file for complete search history.

(56) References Cited

U.S. PATENT DOCUMENTS

| 798,031 | A | * | 8/1905 | Gherky | 138/91 |
|---|---|---|---|---|---|
| 4,060,100 | A | * | 11/1977 | Miller et al. | 138/89 |
| 4,142,371 | A | | 3/1979 | Mayfield et al. | |
| 4,184,515 | A | | 1/1980 | Streich et al. | |
| 4,286,629 | A | | 9/1981 | Streich et al. | |
| 4,462,430 | A | * | 7/1984 | Anthony et al. | 138/89 |
| 4,964,438 | A | * | 10/1990 | Welty | 138/89 |
| 4,984,322 | A | * | 1/1991 | Cho et al. | 15/104.061 |
| 5,164,575 | A | * | 11/1992 | Neeley et al. | 235/472.01 |
| 5,197,605 | A | * | 3/1993 | Hampton | 206/582 |
| 5,297,691 | A | * | 3/1994 | Bottcher | 220/237 |
| 5,390,964 | A | * | 2/1995 | Gray, Jr. | 285/93 |
| 5,558,130 | A | * | 9/1996 | McCabe et al. | 138/89 |
| 5,623,971 | A | * | 4/1997 | Foernzler | 138/89 |
| 5,644,394 | A | * | 7/1997 | Owens | 356/241.5 |
| 5,690,469 | A | * | 11/1997 | Deal et al. | 415/189 |
| 5,765,993 | A | * | 6/1998 | Weiss | 415/209.2 |
| 5,771,937 | A | * | 6/1998 | Collins | 138/93 |
| 6,032,515 | A | * | 3/2000 | Huber | 73/49.1 |
| 6,105,618 | A | * | 8/2000 | Blaney | 138/89 |
| 6,170,529 | B1 | * | 1/2001 | Howe | 138/89 |
| 6,173,491 | B1 | * | 1/2001 | Goodwater et al. | 29/889.1 |
| 6,244,301 | B1 | * | 6/2001 | Scott et al. | 138/89 |
| 6,360,779 | B1 | * | 3/2002 | Wagner et al. | 138/92 |
| 6,381,797 | B1 | * | 5/2002 | Filippovitch et al. | 15/104.061 |

(Continued)

OTHER PUBLICATIONS

International Search Report dated Sep. 22, 2014.

*Primary Examiner* — Patrick F Brinson
(74) *Attorney, Agent, or Firm* — Hudak, Shunk & Farine Co. LPA

(57) ABSTRACT

Foreign material exclusion devices especially adapted to be positioned in a construction, for example a tube or pipe to temporarily seal off a potentially sensitive area of the construction from foreign materials or debris. In one embodiment the device includes a specifically defined, fixed-size eyelet to assist with insertion and/or removal of the device from a construction. Still other embodiments of the device include cavities that retain a trackable coating applied to the device. Further embodiments include identification elements embedded and thus protected within the frame of the device.

20 Claims, 7 Drawing Sheets

(56) References Cited

U.S. PATENT DOCUMENTS

| | | | |
|---|---|---|---|
| 6,506,014 B1 * | 1/2003 | Nolfi et al. | 415/170.1 |
| 6,726,099 B2 * | 4/2004 | Becker et al. | 235/380 |
| 6,824,356 B2 * | 11/2004 | Nolfi et al. | 415/170.1 |
| 7,533,698 B2 | 5/2009 | Nolfi et al. | |
| 2006/0001264 A1 * | 1/2006 | Brass et al. | 285/901 |

* cited by examiner

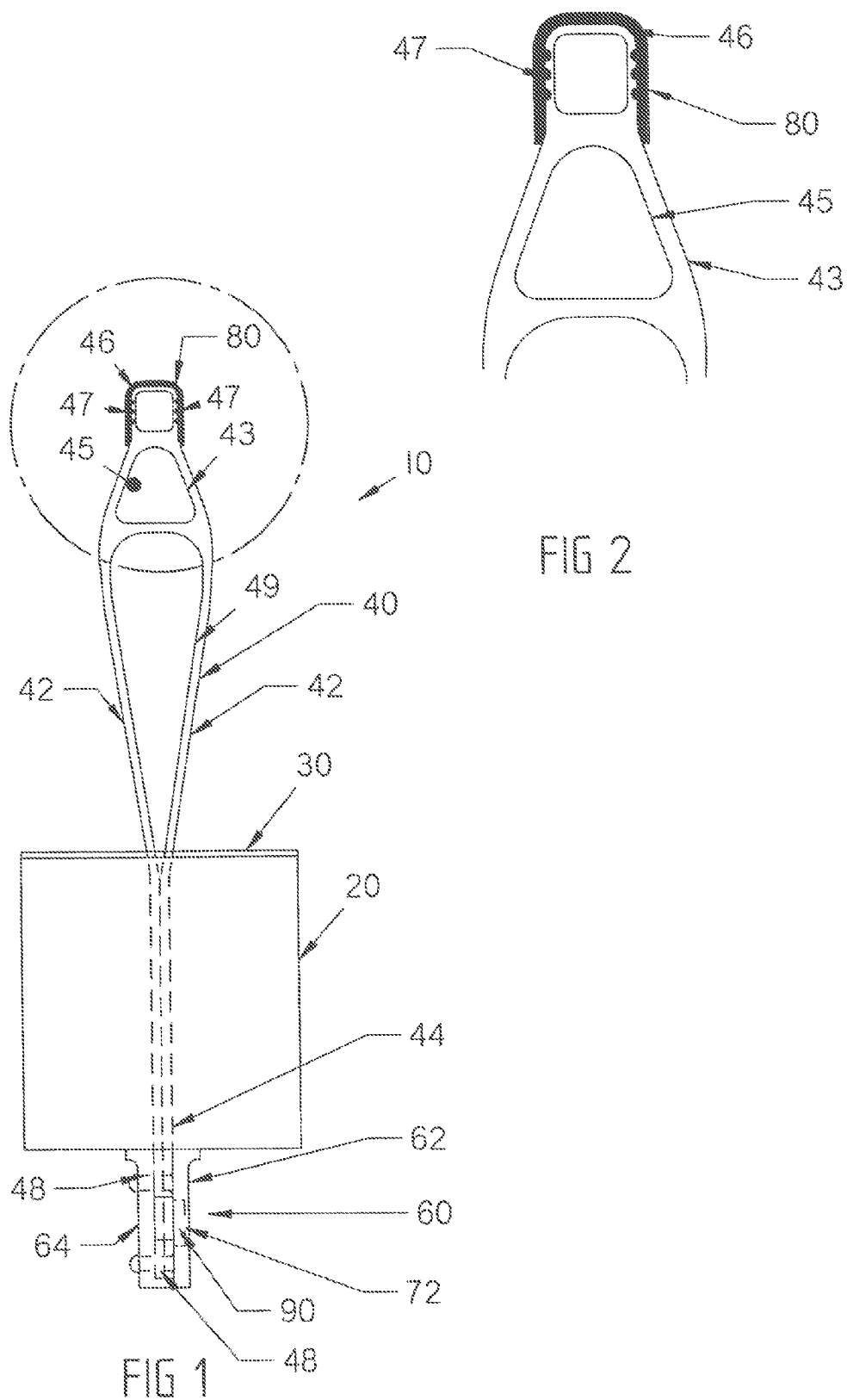

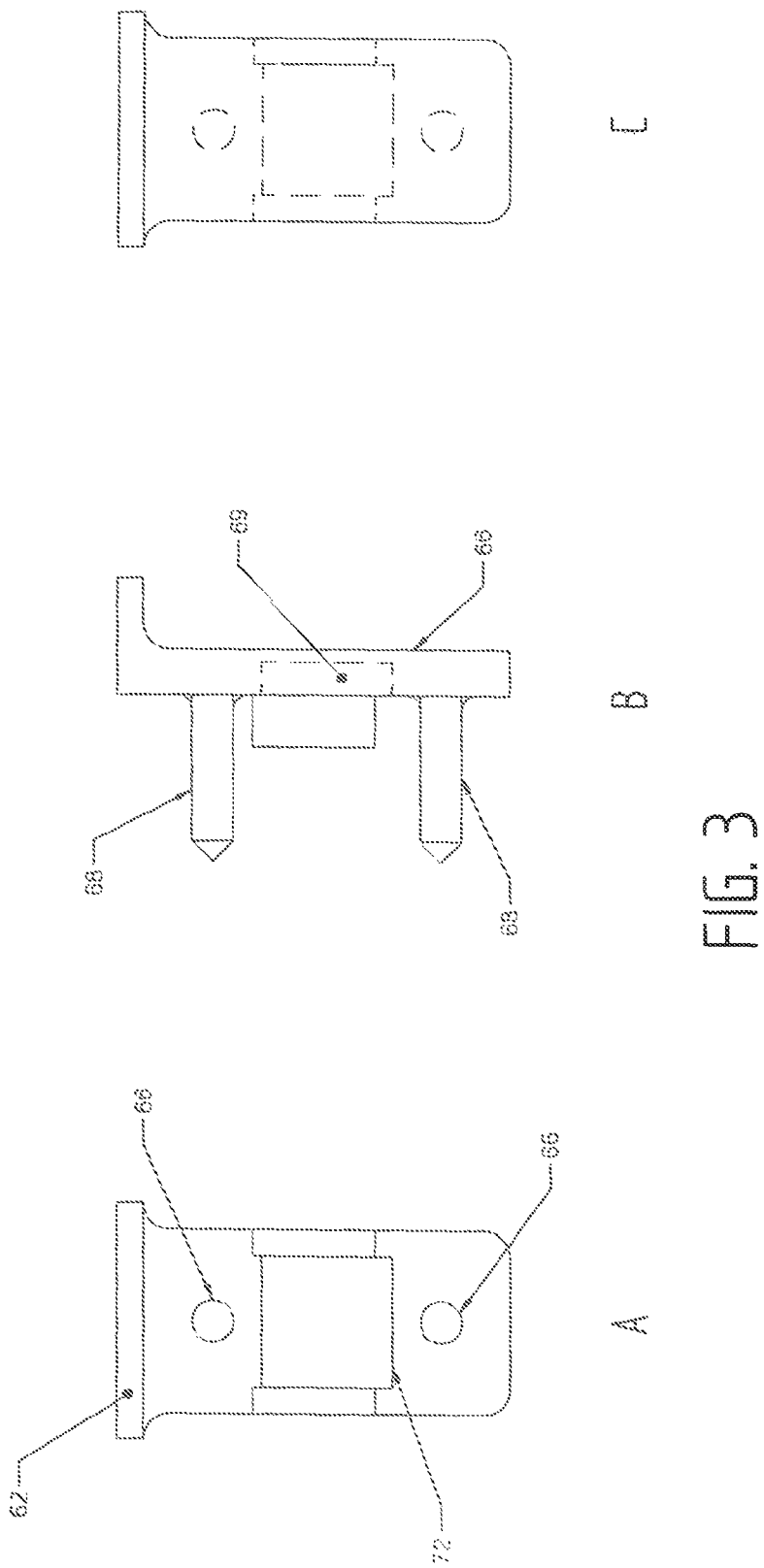

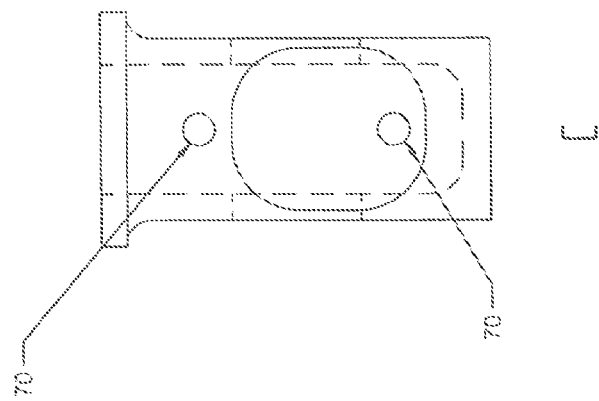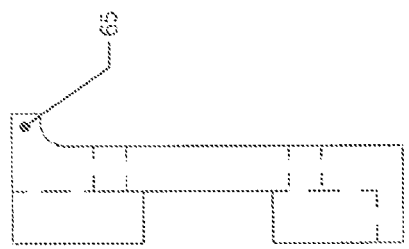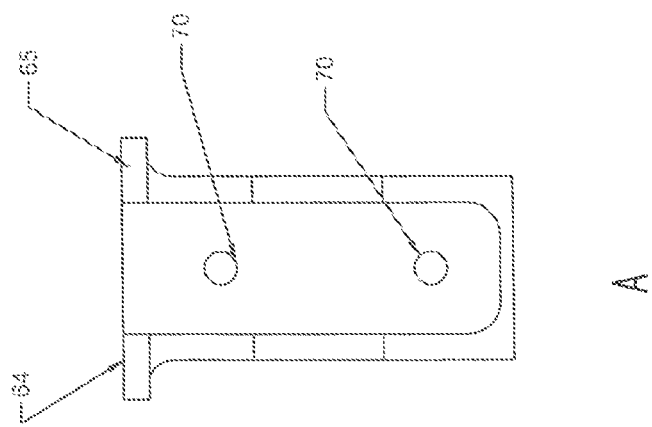
FIG. 4

FOREIGN MATERIAL EXCLUSION DEVICE

FIELD OF THE INVENTION

The present invention relates to foreign material exclusion devices especially adapted to be positioned in a construction, for example a tube or pipe to temporarily seal off a potentially sensitive area of the construction from foreign materials or debris. In one embodiment, the device includes at least one specifically defined, fixed-size eyelet to assist with insertion and/or removal of the device from a construction. Still other embodiments of the device include cavities that retain a trackable coating applied to the device. Further embodiments include identification elements embedded and thus protected within the frame of the device.

BACKGROUND OF THE INVENTION

During assembly or maintenance of various assemblies or constructions in various industries, it is desirable to prevent the introduction of debris into one or more areas to prevent damage to various objects or prevent safety hazards. Foreign material exclusion is of particular concern in the field of power generation and supply, weather nuclear, hydro or fossil fueled in order to prevent or reduce power shortages and outages, as well as increase nuclear safety.

While undergoing maintenance or assembly, small parts, screws, bolts, or other foreign objects can fall into crevices. If not prevented, retrieved or noticed, such parts can have the potential to destroy or at least damage a particular unit and produce varying consequences, potentially catastrophic.

U.S. Pat. No. 6,506,014 relates to a device which can be utilized to temporarily seal substantially any opening on a turbine which is being assembled or repaired. The foreign material exclusion device reportedly advantageously maintains fail-safe integrity of desired portions of a turbine. Protection of the sensitive areas of a turbine prevents possible hazardous malfunctions or explosions of a turbine. The foreign material exclusion device is substantially elastic or resilient and can be compressed to fit into a desired opening and can be re-expanded to provide a snug fit about an opening.

U.S. Pat. No. 6,824,356 relates to a device which can be utilized to temporarily seal substantially any opening on a turbine which is being assembled or repaired. The foreign material exclusion device includes a main body, preferably formed from a foamed polymer or rubber. The foreign material exclusion device is substantially elastic or resilient and can be compressed to fit into a desired opening and can be re-expanded to provide a snug fit about an opening. An extraction member is connected to the main body and is preferably utilized to remove the device from a portion of a cavity of a turbine.

U.S. Pat. No. 7,533,698 relates to a foreign material exclusion device which is adapted to be utilized in tubes, pipes, or the like to prevent entry of debris into a potentially sensitive area of an assembly, such as a turbine assembly utilized in a power plant. In one embodiment, the device is adapted to be connected to a non-moving portion of a rotary milling tool, such as the collet, before a milling operation to prevent milling debris from entering a sensitive portion of a tube or pipe. In a further embodiment, each device of the invention includes a unique identifier or identification element, such as a machine readable bar code or RFID (radio frequency identification) tag, to insure all devices utilized for a particular job are accounted for.

SUMMARY OF THE INVENTION

In view of the above, it would be desirable to provide a reliable, durable foreign material exclusion device that can be utilized to maintain debris-free integrity of an area.

It is an object of the present invention to provide a device comprising a post having at least one retrieval eyelet of a fixed, defined size in order to allow consistent retrieval of the device from a construction after a particular job has been completed.

Yet another object of the present invention is to provide the device with an eyelet having a narrow upper end when compared to the lower end of the eyelet in order to facilitate reliable removal from a construction.

A further object of the present invention is to provide the device with a post having an upper end, located above the eyelet, that includes one or more and preferably a plurality of cavities that adapted to hold a composition or coating, in particular a trackable coating, for example an x-ray visible coating.

Another object of the present invention is to provide devices that can be individually identified, tracked and accounted for during all phases of assembly or maintenance on construction.

Still another object of the present invention is to provide a device with an electronic tracking system that provides a signal which can be detected and the location of the foreign material exclusion device can be identified to a user, with the electronic tracking system being embedded within the device, for example in an internal cavity such that the system is protected from possible damage.

An additional object of the present invention is to provide a device having a support base adapted to be located below a body which is substantially elastic or resilient and can be compressed to fit into a desired opening and can be reexpanded to provide a snug fit about the opening thereby substantially sealing the same and preventing foreign materials such as parts, metal shavings or the like from gaining access to a potentially sensitive, desired area, with the base including a flange extending laterally outwardly from the base in order to support the body.

In one aspect, a foreign material exclusion device is disclosed, comprising a resilient body; a post having a first end and a second end with the post extending through the body, with the body operatively connected between the ends, the first end of the body including a first eyelet of a fixed size extending through the post from a first side to a second side, with a perimeter of the first eyelet bounded by post material.

In another aspect, a foreign material exclusion device is disclosed, comprising a resilient body; a post having an upper end connected to a lower end by a post connector, a first eyelet located adjacent the upper end and having a fixed size, wherein a base is formed at the second end and is integral with the post, wherein the body is located between the base and the first eyelet.

In a further aspect, a foreign material exclusion device is disclosed, comprising a resilient body; a post having a first end and a second end connected together by a post connector, wherein a base is integrally connected to the second end of the post and includes an outwardly extending flange adapted to contact one end of the body, with the body being operatively connected to the second end of the post, wherein the post connector includes a female fitting connected to the first end or the second end with a male connector being connected to the other end.

BRIEF DESCRIPTION OF THE DRAWINGS

The invention will be better understood and other features and advantages will become apparent by reading the detailed description of the invention, taken together with the drawings, wherein:

FIG. 1 is a side elevational view of one embodiment of a foreign material exclusion device of the present invention including a post having an eyelet, with a body being located between the upper end of the post and a support base which also includes an internal cavity that houses an electronic tracking system;

FIG. 2 is a close-up view of one embodiment of an upper end of a post of the present invention including a plurality of cavities accepting a portion of a trackable coating;

FIGS. 3A-C are a side elevational views of one embodiment of a male fitting of a support base of the present invention including a flange and a portion of a cavity;

FIGS. 4A-C are side elevational views of one embodiment of a female fitting of a support base of the present invention including a flange and a portion of a cavity;

DETAILED DESCRIPTION OF THE INVENTION

Figure 5:
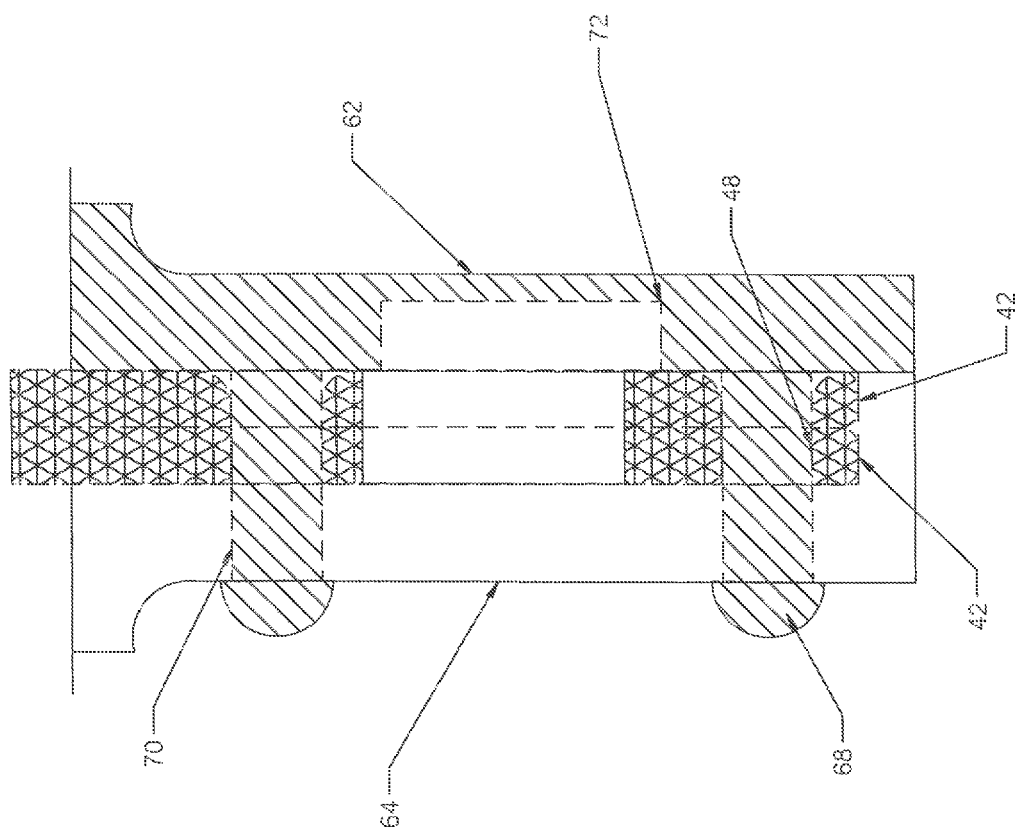
FIG. 5 is a cross-sectional view of one embodiment of a first section of support base being secured to legs and second section of the foreign material exclusion device.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The foreign material exclusion devices of the present invention are especially adapted to be temporarily positioned in a construction, for example, but not limited to, a tube, a pipe, an orifice, a cavity, or the like to seal off a potentially sensitive area of the construction from foreign materials, debris or the like. As an example, it is desirable to protect a construction such as a turbine and a power plant from debris as the turbine can be catastrophically damaged by parts, metal shavings or the like. Foreign material exclusion devices can be utilized during construction, assembly, repair or the like of a portion of a product such as, but not limited to, a turbine, a pump, a fan, a housing, a boiler tube, an engine or any other device with limited access openings and/or cavities.

Referring now to the drawings, wherein like parts or components represent like or identical reference members through the several views, FIG. 1 illustrates one embodiment of a foreign material exclusion device 10 that generally comprises a resilient body 20 operatively connected to one or more posts 40, with a support base 60 being connected to a lower end of the one or more posts 40. A trackable coating 80 is connected to a portion of a post 40. Additionally, an electronic tracking system 90 is housed within support base 60 in order to protect the tracking system from damage.

Figure 6:
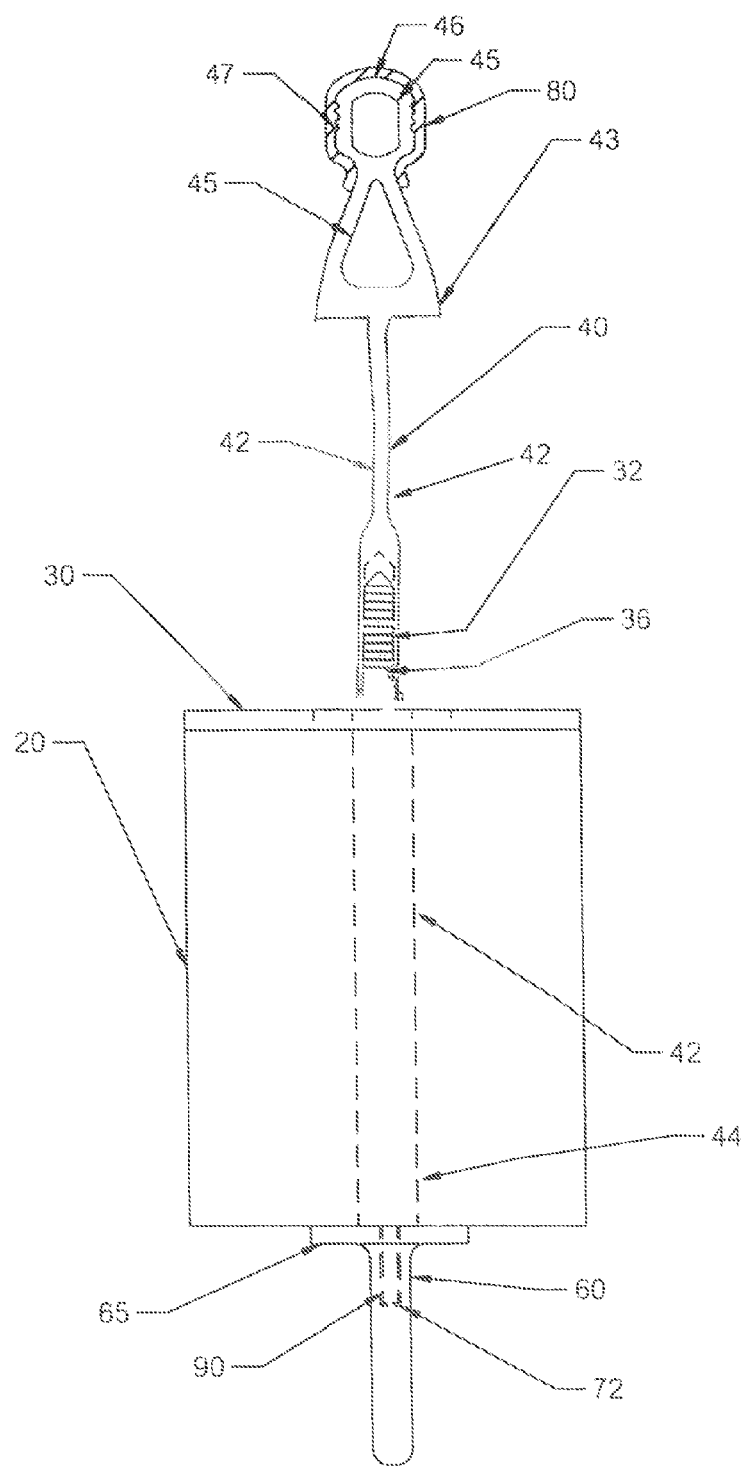
FIG. 6 is a side view of a further embodiment of the present invention including a post having a single leg that is connected to a support base.
Figure 7:
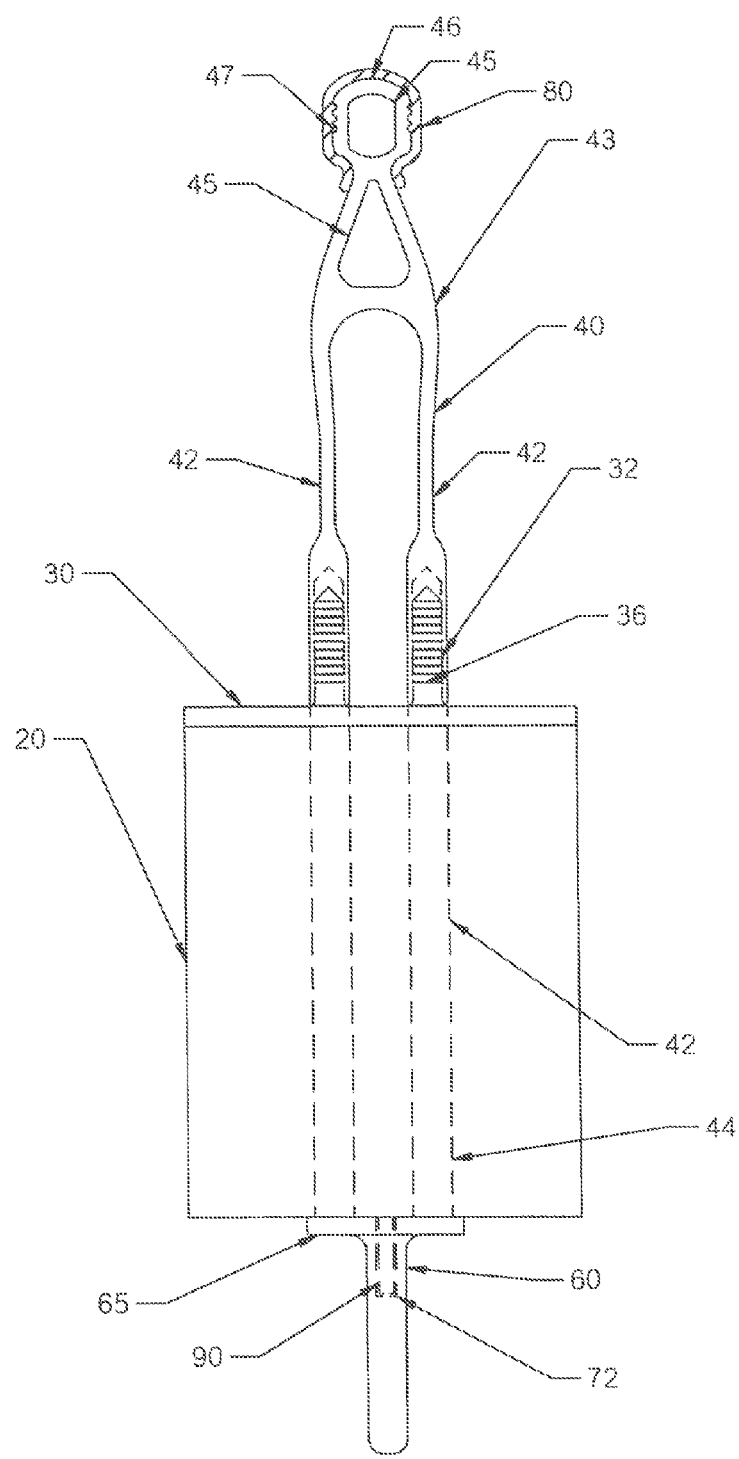
FIG. 7 is a side elevational view of a further embodiment of a foreign material exclusion device of the present invention including a post having a eyelet, with a body being located between an upper end of the post and a support base which includes an internal cavity adapted to house an electronic tracking system.

Post 40, as indicated herein, can include one or more legs 42, with a pair of legs 42 illustrated in FIGS. 1 and 7, and a single leg 42 shown in FIG. 6. A portion of leg 42 extends through an aperture in a section of body 20, with body 20, being slidably moveable along a portion of the longitudinal length of leg 42 in some embodiments, generally between support base 60 and a lower end of the cavity housing.

Post 40 as illustrated in FIG. 1 generally includes an upper end 43 and a lower end 44. The length of each leg 42 can vary, and generally depends on factors such as the depth and/or thickness of body 20, the configuration of body 20 and even the construction the device 10 is to be utilized in conjunction with. Likewise, the thickness of the leg 42, generally the dimension shown in FIG. 1, can vary in order to provide desired strength, weight, or the like. That said, one embodiment the width of a leg 42 ranges from about 0.25 to about 0.5 cm and is preferably from about 0.07 cm to 0.17 cm. The width in some embodiments ranges generally from about 0.1 to about 0.7 cm and preferably from about 0.3 to about 0.5 cm.

The upper end 43 of post 40 includes an eyelet 45 of a fixed, defined size. Eyelet 45 allows consistent retrieval of device 20 from a construction after a job has been completed or it is desired to reposition or even aid in placing the device 10 within the construction, for example. Eyelet 45 extends completely through post 40 which allows a tool such as hook to extend through the eyelet whereby the device can be pulled from a construction 100, for example by pulling upward on the device as illustrated in FIG. 1, or placing or repositioning the device 10 within the construction by pushing downward on the lower end of the cavity 45. In other embodiments a line can be directly connected to, e.g. tied to device 10 utilizing eyelet 45. In one embodiment as illustrated in FIG. 1, the cavity has a generally triangular cross-section, with a narrower upper end and a wider base or lower end. This configuration allows for consistent removal of a foreign material exclusion device 10 from a construction 100. The wider lower end also serves to facilitate easier access of a hook or other removal device into cavity 45, especially in a dark or unlit area of a construction at which the device 10 may be positioned.

Upper end 43 of post 40 includes a tip 46 that includes one or more cavities 47. Preferably a plurality, that is two or more cavities are provided at a sufficient depth in order to hold, house or otherwise accept a coating, in particular a trackable coating. The size and shape of each cavity 47 can vary. Examples of suitable cavities include indentations, recesses, and even through holes or bores that extend completely through the tip 46 of post 40 from one side to the other, for example as illustrated in FIG. 2. An important benefit of the cavity 47 is that a composition 80 can be located therein. In various preferred embodiments, composition 80 is in the form a coating that can be applied to device 10 in particular to the one or more cavities 47. The composition 80 is preferably a trackable coating, for example an x-ray visible coating. Providing a cavity 47 with a coating prevents the composition from being more easily separated from the device. Trackable coatings for example include a polymeric base having particles, preferably x-ray-visible particles present therein, for example metal particles. The trackable composition is visible on x-ray, for example when a section of a construction is x-rayed to determine whether or not any parts such as foreign material exclusion devices have been left in a construction after assembly or repair. In one embodiment, the composition 80 can be applied by dipping the tip 46 end of the post 40 into the composition. Other suitable methods of application can be utilized, for example including, but not limited to, spraying, brushing, roll coating, molding, or the like.

FIG. 1 illustrates the post 40 having a pair of legs 42 extending downwardly from upper end 43. The legs can be separated by any desirable distance which will depend upon the relative size of the foreign material exclusion device 10 to be constructed. The lower end 44 of a leg 42 includes one or more apertures 48, that are utilized to connect support base 60. Two apertures 48 are illustrated on each leg 42 in FIG. 1.

Post 40 is preferably formed from a polymeric material, for example by injection molding. Other materials can be utilized. The various polymers include homopolymers, copolymers and block copolymers, for example with the choice of polymeric material depending upon the on factors including the type of construction with which the device will be utilized. In one preferred embodiment the polymeric material has low halogen content, for example in one embodiment less than 350 ppm. Flame retardant polyamides such a Nylon 6 are preferred in some embodiments.

The composition of body 20 of the exclusion device is generally a polymer, a rubber, or a polymer or rubber foam. It is important that body 20 is elastic or resilient in nature so that it can be compressed to fit into a desired opening, and yet re-expand to provide a snug fit within or about the opening. The resiliency of body 20 allows the foreign material exclusion device to hold itself in place in a predetermined location or orifice.

The actual size dimensions, i.e. the length, width, and thickness of body 20 of foreign material exclusion devices 10 of the present invention will vary depending on the size and shape of the orifice, tube, opening, etc. which is to be protected or isolated. That is, body 20 of foreign material exclusion device 10 is not limited to one specific geometric or random shape or size such as a cylinder, cube, block, or the like, but is custom tailored or profile fit to the dimensions of generally each cavity or turbine assembly orifice. That said, preferred foreign material exclusion devices have a body 20 that is substantially cylindrical or block shaped. Body 20 is dimensioned to provide a resilient snug fit with the abovementioned orifice which thereby provides a barrier to the entrance of foreign materials. Foreign materials can generally be defined as any object, particle or the like such as, but no limited to, nuts, bolts, metal bits, debris, hand tools, sockets, measuring devices, or any other material not designed to be located in a desired area of a turbine assembly. The thickness of body 20, generally measured in a direction parallel to the longitudinal direction of was of tube 100 such as shown in FIG. 1, is sufficient to maintain a snug or tight fit about the desired opening. Dimensions can vary widely by application, with the primary goal of foreign object exclusion requiring sufficient strength to retain the heaviest object used in that portion of the protected device.

Body 20 of the material exclusion device of the present invention is generally formed from a polymer or rubber, and is preferably a foam or foam like material. Foams are cellular materials generally having small hollow spaces which occur during manufacture of the foam. If the cells are fully surrounded by cell walls, the foam is called closed cell foam. In mixed cell foams, the cell was are partially perforated. In open cell foams, the cells have gas phase connections to each other. Any of the above-mentioned foam types can be utilized in the present invention so long as the foams can be resiliently compressed and prevent the foreign material from entering a predetermined area of the turbine. Generally, open cell foams are preferred as they are more flexible and elastomeric when compared to closed cell foams which tend to be compression resistant.

Suitable polymer compositions which can be foamed to form the body of the present invention include polyethylene, e.g. low density polyethylene and high density polyethylene (HDPE), polypropylene, and copolymers of ethylene or propylene and a monoethylenically unsaturated monomer copolymerizable therewith. Other suitable polyolefins include branched polypropylene homopolymer and branched copolymers of polypropylene. Examples also include copolymers of ethylene and acrylic acid or methyl acrylic acid and $C_1$-$C_4$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e., densities less than 0.92 g/cc); blends of all of the above resins; blends thereof with polyethylene (high, intermediate or low density), etc.

Other suitable polymeric compositions which may be used in the practice of the invention include, but are not limited to, polyesters, polyamides, polyvinylchloride, polyvinylidene chloride, polycarbonates, polyurethanes, and polystyrene resins.

Rubbers include silicones and copolymers of ethylene and propylene and can be prepared by known addition polymerization techniques, including the use of small amounts of a diene such as butadiene. Additional rubber or elastomeric components include various conjugated dienes having from 4-8 carbon atoms such as isobutylene, butadiene, and ethylene/propylene/diene interpolymers may be included in the blend if desired. Rubbers include the aromatic containing rubbers such as styrene, butadiene rubber and the like. Moreover, additional components such as crosslinking agents designed to provide latent crosslinking of the ethylenic or propylenic polymer, such as silane functional crosslinking agents, or covalent or ionic crosslinking agents, may be included if desired.

The thermoplastic polymer material or blend is melt processed in a conventional manner by feeding, melting, and metering into a conventional melt processing apparatus such as an extruder. A volatile blowing agent and an optional crosslinking agent are mixed with the polyolefin polymer or blend under a pressure suitable to form a flowable gel or admixture. A crosslinking agent may be added in an amount which is sufficient to initiate crosslinking and raise the pressure of the mixture to less than that pressure which causes melt fracture of the polymer to occur. The term "melt fracture" is used in the art to describe a melt flow instability of a polymer as it is extruded through a die, which flow instability causes voids and/or other irregularities in the final product.

Any other known methods for producing foam compositions can also be utilized to form the foam utilized in the present invention.

The foam blends are generally prepared by heating the desired polymer or rubber to form a plasticized or melt polymer material, incorporating therein a blowing agent to form a foamable gel, and extruding the gel through a die to form the foam product. Prior to mixing with the blowing agent, the resin or blend is heated to a temperature at or above its glass transition temperature or melting point. The blowing agent may be incorporated or mixed into the melt polymer material by any means known in the art, such as with an extruder, mixture, blender, or the like. The blowing agent is mixed with the melt polymer material at an elevated pressure sufficient to prevent substantial expansion of the melt polymer material and to generally disperse the blowing agent homogeneously therein. Optionally, a nucleating agent may be blended in the polymer melt or dry blended with the polymer material prior to plasticizing or melting. The foamable gel or melt is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam product. The zone of lower pressure is at a pressure lower than that in which the foamable gel is maintained prior to extrusion through the die. The lower pressure may be super-atmospheric or sub-atmospheric (vacuum), but is preferably at an atmospherical level.

The polymer or rubber foam may be open or closed-celled, as desired. The percentage of open cells can be controlled, as is well known in the art, by appropriate selection of blowing agents, additives, polymers, and processing parameters, such as temperatures, pressures, and extrusion rates. A preferred foam of the present invention is polyester and is available from sources including Orbis Manufacturing of Mentor, Ohio.

While the density of the foam can vary, the foams of the present invention are generally considered lightweight and range generally from about 1 to about 200 or 300 kg/m$^3$, desirably from about 5 to about 150 kg/m$^3$, and preferably from about 10 to 20 to about 50, about 75, or about 100 kg/m$^3$.

It is also possible to add various additives such as inorganic fillers, pigments, anti-oxidants, acid scavengers, ultraviolet absorbers, flame retardants, surfactants, processing aids, extrusion aids and the like is suitable as known to those of ordinary skill in the art.

Other additives include inorganic substances such as calcium carbonate, talc, clay, titanium oxide, silica, barium sulfate, diatomaceous earth and the like, carbon dioxide generated by the combination of a bicarbonate or a carbonate of sodium, potassium, ammonium or the like and an inorganic or organic acid such as boric acid, citric acid, tartaric acid or the like, thermal decomposition type chemical foaming agents such as azodicarbonamide, benzenesulfonyl hydrazide, toluene-sulfonyl hydrazide and the like.

The volatile foaming agents usable in this invention generally have a boiling point temperature range of −90° C. to +80° C., and include, but are not limited to, aliphatic hydrocarbons such as n-pentane, isopentane, neopentane, isobutene, n-butane, propane, ethane and the like; fluorochlorinated hydrocarbons such as dichlorotetrafluoroethane, trifluoroethane, trichloromonofluoromethane, dichloro-difluoromethane, dichloromonofluoromathane, and the like. Among them, the non-fully halogenated hydrocarbons are preferred because of environmental considerations. Particularly preferred among the non-fully halogenated hydrocarbons are partially or fully fluorinated hydrocarbons and non-fully halogenated fluorochlorinated hydrocarbons. Examples of these include 1-chloro-1,1-fluoro-ethane, 1,1,1,2-tetrafluoroethane and 1,1-difluoroethane. Particularly preferred among the aliphatic hydrocarbons are isobutene and isobutene/n-butane mixtures. Other blowing agents which may be employed include alcohols such as methanol and ethanol. Also contemplated are inorganic blowing agents such as carbon dioxide, water, nitrogen, argon and combinations thereof, as well as combinations of these inorganic blowing agents with hydrocarbon and/or halogenated hydrocarbon blowing agents. Also decomposable blowing agents, such as azobisformamide, may be incorporated with the volatile foaming agents. Mixtures of any or all of these volatile foaming agents are also contemplated within the scope of the invention. Also contemplated are combinations including water and/or carbon dioxide as the primary blowing agent.

Optionally, but preferably, a flame retardant, resistant, or quenching coating or covering 30 is applied to any of the foreign material exclusion devices 10 described in this application, preferably on at least body 20 thereof. The flame retardant coating or covering 30 can be applied to one or more sides of the body, especially the portion thereof which can be exposed to high temperature debris, chips, filings, etc., such as from a welding process on the construction. The coating or covering 30 is also heat resistant. As illustrated in FIG. 1, the foreign material exclusion device 10 includes a flame retardant, resistant, or quenching coating or covering 30 on the top surface of body 20. The coating or covering 30 is any suitable thickness to provide the desired flame or heat resistant properties. In one embodiment, the coating or covering 60 is on top of or in surface contact with at least a portion of the device, and in a second embodiment, saturates a portion of the body of the device in addition to being present on a surface. Coating or covering 30 on the foreign material exclusion device 10 has a sufficient thickness to achieve the desired goal of providing flame retardant, flame resistant, or the like properties. Coating or covering 30 thickness may vary from surface to surface and vary on a single surface, and ranges generally from about 0.010 to about 0.25 inches, desirably from about 0.020 to about 0.20 inches, and preferably from 0.05 to about 0.15 inches.

Such coatings are well known in the art and are generally latexes such as HCF from PDI, Inc, of Circle Pines, Minn. Coverings of the present invention include, but are not limited to, woven and nonwoven, natural and synthetic fibers, and are available from many different commercial sources. In other embodiments, coverings are a layer(s) of organic or inorganic material, or a combination thereof, such as a polymer layer or a graphite layer.

The flame retardant coating or covering 30, or combination thereof, is applied to at least one surface of a foreign material exclusion device 10 of the invention utilizing one or more methods, including but not limited to, spray coating, roll coating, screen printing, bonding, or the like. Flame retardant coverings in one embodiment are applied utilizing an adhesive comprising a hot melt adhesive, an epoxy, a polyurethane, a phenolic resin or the like, with the adhesive disposed between the covering and foreign material exclusion device body surface. Hot melt adhesives are preferred in one embodiment. In a preferred embodiment, a sheet of body material having a predetermined thickness is coated with the coating on at least one surface by roll coating, spraying or the like. Afterwards, a desired number of device bodies 20 are formed from the coated sheet. In one embodiment, body 20 is cut from the sheet, preferably with a die cutting apparatus, waterjet cutting apparatus, or cold laser as known in the art.

The support base 60 operatively maintains body 20 connected to foreign material exclusion device 10. In one embodiment illustrated in FIGS. 1-5, support base 60 includes a first section 62, see FIGS. 3A-C and a second section 64, see FIGS. 4A-C. The support base 60 is connected, preferably permanently in some embodiments, to one or more legs 42 after body 20 has been connected to one or more legs 42 of post 40. The support base 60 includes a flange 65, preferably at an upper end, generally extending outwardly with respect to the general longitudinal axis of the device in order to provide a desirable support surface for the base of body 20. The design of the flange depends on factors such as size of the body 20, composition of the body, and constructions in which the device 10 will be utilized.

FIGS. 3A-C illustrate first section 62 of support base 60. First section 62 includes a one or more male fittings 68 extending outwardly from a portion of base 66 for mating with female apertures 70 of second section 64. The support base 60 includes an internal housing 72 formed by portions of first sections 62 and 64. One or more of the first sections 62 and second section 64 include an internal housing 72 that is adapted to contain and protect one or more of a sensor and an electronic tracking system 90. When the first section 62 and second section 64 are mated together about post 40, the internal housing 72 is formed therebetween, see FIG. 1 for example. The dimensions of the internal housing 72 can vary depending upon the size of the sensor and/or electronic tracking system 90 desired to be utilized in device 10.

The support base 60 can be connected to post 40, for example by inserting the male fitting 68 through apertures 48 in leg 42 of post 40 as well as through apertures 70 present in second section 64. In order to connect the sections 62 and 64, the male fitting 68 can be heat welded or thermal welded, see FIG. 5 for example, thereby connecting first section 62 to second section 64. Support base 60 can be formed from the same or different materials utilized to form post 40.

Assembling the foreign material device as illustrated in FIG. 1 creates a second eyelet bounded by legs 42 of post 40 and the top portion of body 20, below first, permanent eyelet 45. The second eyelet allows the legs to be pushed through the body allowing a mandrel from a milling tool or other item to be placed above. The second eyelet also allows retrieval by the technician after the machining or other operation. In embodiments where the body 20 is movable in relation to post 40, the size or dimensions of the second eyelet can vary. Additionally, a third eyelet or space between legs 42 is created if the body is moved upwardly on legs 42 of post 40 above support base 60, as can be imagined from the view illustrated in FIG. 1.

In a preferred embodiments the electronic tracking system 90 is an RFID tag or device. Radio Frequency Identification (RFID) is utilized on foreign material exclusion devices 10 of the present invention, as shown in FIG. 1. An RFID tag contains unique information that identifies the foreign material exclusion device 10 it is attached to and can share that information wirelessly with computer databases and networks so that the foreign material exclusion device 10 can be tracked efficiently. The RFID system generally comprises two components, namely, an interrogator, also called a reader, and a tag, also called a transponder or "slave" that has a unique identification code. Data is exchanged between tags and readers using radio waves between the tag and the reader, and no direct line of sight is required for the transaction. Accordingly, foreign material exclusion devices 10 containing RFID tags can be identified even in tubes, pipes, or other orifices. The reader asks the tag for the code, or processes the signal being broadcast by the tag, decodes the transmission and transfers the data to a computer. The computer in turn, may simply record the reading, or look up the tag ID in a database to direct further action, and may also direct the reader to write additional information to the tag. RFID technology allows a plurality of individual foreign material exclusion devices 10 within a group to be uniquely identified at the same time.

RFID tags are generally passive or active. Passive tags generally have no internal power source but serve to identify the object attached thereto. Active tags often have their own power source and are generally rewriteable to provide flexibility to update data thereto. The RFID tag generally contains a chip as well as an antenna which are mounted on a substrate, such as label material. The label material can be printed upon or pre-coated for use. Many different sizes of RFID tags are available, with sizes ranging from fractions of an inch to about 1"×2", and 4"×6". RFID tags and systems are commercially available from sources such as LXE, Impinj, Zebra, or the like.

FIG. 6 illustrates a further embodiment of the present invention, wherein post 40 includes a single leg 42 that extends through body 20 whereby the body is captured between support base 60 and upper end 43 of post 40 which includes an eyelet 45.

Figure 8:
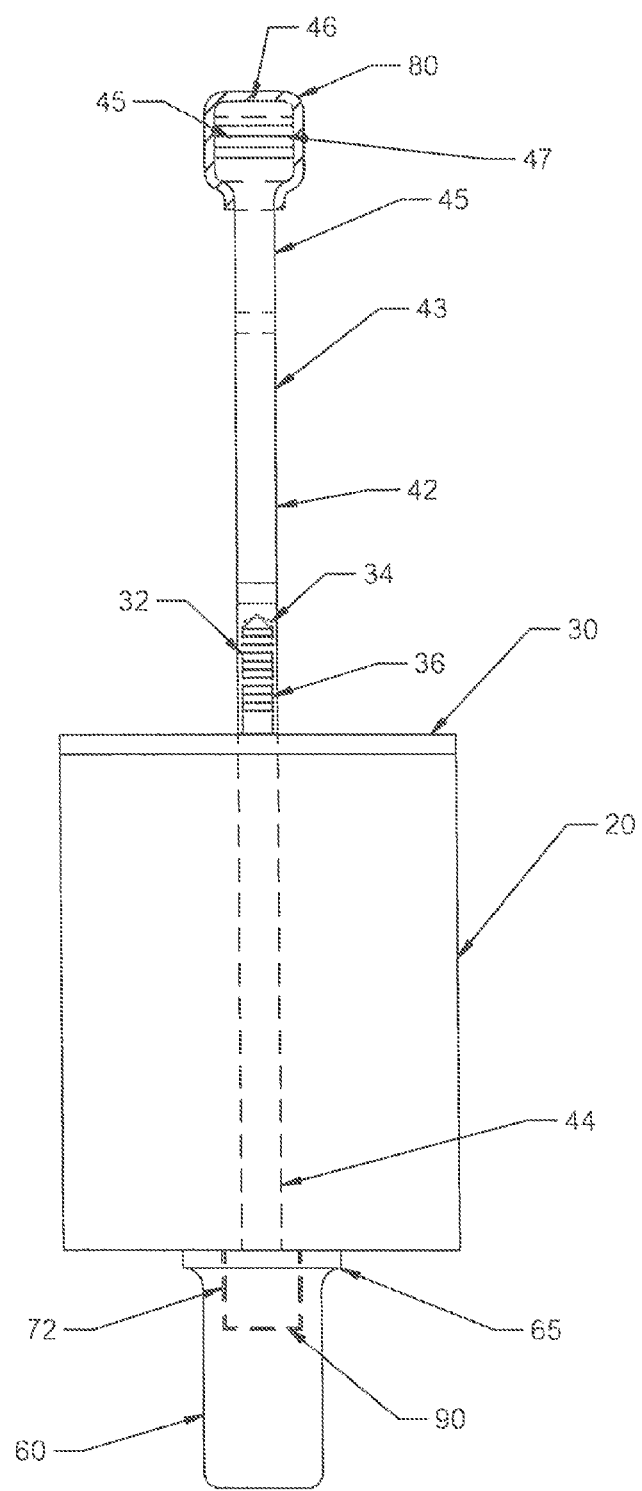
FIG. 8 is a second side elevational view of the embodiment illustrated in FIG. 7 with the device turned 90°.

A further embodiment of a foreign material exclusion device 10 is illustrated in FIGS. 7 and 8. Therein, device 10 includes a resilient body 20 operatively connected to post 40 including a pair of legs 42. Alternatively, it is understood that post 40 can include a single leg 42 for example as illustrated in FIG. 6. A portion of leg 42 extends through an aperture in a section of body 20. Depending upon the friction or fit between body 20 and leg 42, the former may be slidably movable along portions of leg 42.

The embodiment in FIGS. 7 and 8 illustrates post 40 having an initially separate first or upper end 43 and a second or lower end 44 terminating at an integral support base 60, with the ends being connected after the body 20 is connected to one of the ends, preferably end 44 as illustrated. As with the other embodiments illustrated, the length of each leg 42 can vary, along with the width and thickness thereof.

FIG. 7 illustrates the upper end 43 of post 40 including a pair of eyelets 45, 45 each, of a fixed, defined size, with a perimeter of each eyelet 45 bounded by post material. Each eyelet extends completely through post 40 from a first side to a second side in a preferred embodiment. A trackable coating composition 80 can be located within a portion of cavity 45. In some embodiments one or more cavities 47 are also included on the upper end 43 of post 40 which also accept a coating, as described further herein. A third eyelet is present and formed below the first two eyelets 45, 45 between legs 42 and the upper surface of body 20 that can also be utilized to aid in removal of the device from a cavity, if desired.

FIG. 7 also illustrates post 40 including a post connector 32 that connects a first segment of the post to a second segment, for example the upper segment or upper end 43 of post 40 to lower end 44 of post 40, as illustrated in FIG. 7. In one embodiment the post connector 32 includes a female fitting 34 mateable with a male fitting 36. In one embodiment, the female fitting includes a recess and the male fitting 36 includes a projection that is operatively and preferably permanently connected to female fitting 34. Other types of joining mechanisms and connections known to those of ordinary skill in the art can be utilized, including but not limited to connectors have teeth, threads, pins, or plugs, that preferably permanently connect the individual post segments.

In one embodiment, the male fitting includes a plurality of teeth that preferably slope in one direction. The female filling includes a slot with a flexible pawl that rides up the slope of the teeth when the male fitting is inserted into the female filling. The pawl engages the back side of the teeth in order to prevent removal of the male fitting from the female fitting. This form of arrangement is sometimes also referred to as a gear rack located on the male fitting and a ratchet located on the female fitting.

The embodiment illustrated in FIGS. 7 and 8 connects the upper end 43 of post 40 to the lower end 44 above the top end of body 20. Thus, no connectable parts are located below body 20 that can be lost or misplaced within a construction.

As described herein, the support base 60 connected to the bottom of post 40 includes an integral flange 65 that extends outwardly from base 60, a sufficient distance to provide desired support for body 20. In one embodiment the second or lower end 44 of post 40 is formed by injection molding.

The support base 60 also includes an internal housing 72 as illustrated in FIGS. 7 and 8. The internal housing is generally centrally located and extends downwardly from a top surface of support base 60. Internal housing 72 has a sufficient depth in order to house an electronic tracking system 90, which can be inserted into the internal housing 72 prior to installation of the body on the lower end 44 of post 40.

As illustrated in FIG. 8, the support base 60 includes a surface that can be utilized to include indicia or other markings to identify the foreign material exclusion device for a user.

In accordance with the patent statutes, the best mode and preferred embodiment have been set forth; the scope of the invention is not limited thereto, but rather by the scope of the attached claims.

What is claimed is:

1. A foreign material exclusion device, comprising:
   a resilient body;
   a post having a first end and a second end with the post extending through the body, with the body operatively connected between the ends, the first end of the post including a first eyelet of a fixed size extending through the post from a first side to a second side, with a perimeter of the first eyelet bounded by post material, wherein the post includes a post connector that connects the first end of the post to the second end.

2. The foreign material exclusion device according to claim 1, wherein the first eyelet has a first end and a second end, the first end being located further away from the body and being narrower in width than the second end.

3. The foreign material exclusion device according to claim 1, wherein the first or second post end includes a female fitting and the remaining end includes a male fitting that interlocks with the female fitting.

4. The foreign material exclusion device according to claim 1, wherein the post includes a second eyelet of a fixed size extending through the post from the first side to the second side, with a perimeter of the second eyelet bounded by post material.

5. The foreign material exclusion device according to claim 1, wherein a trackable coating is present on a surface of the post.

6. The foreign material exclusion device according to claim 5, wherein the trackable coating is present in one or more of a cavity located on a tip of the post and one of the eyelets of the post.

7. The foreign material exclusion device according to claim 1, wherein a base is connected to the post, where the base includes a flange extending laterally outwardly from the base, and wherein the base includes an internal housing adapted to hold one or more of a sensor and an electronic tracking system.

8. The foreign material exclusion device according to claim 7, wherein the internal housing is a cavity that extends downwardly from an upper surface of the base, and wherein the base is integrally formed with the second end of the post.

9. The foreign material exclusion device according to claim 7, wherein the base includes a first section connected to a second section, wherein one of the sections includes a male fitting that extends through an aperture in the post and through an aperture in the other section.

10. A foreign material exclusion device, comprising:
    a resilient body;
    a post having an upper end connected to a lower end by a post connector, a first eyelet located adjacent the upper end and having a fixed size, wherein a base is formed at the second end and is integral with the post, wherein the body is located between the base and the first eyelet.

11. The foreign material exclusion device according to claim 10, wherein a first section or second section of the post connector includes a female fitting and the remaining section includes a male fitting that interlocks with the female fitting.

12. The foreign material exclusion device according to claim 11, wherein the first eyelet has an upper end and a lower end, the upper end being located further away from the body and being narrower in width than the lower end.

13. The foreign material exclusion device according to claim 12, wherein the post includes a second eyelet of a fixed size extending through the post from a first side to a second side, with a perimeter of the second eyelet bounded by post material, wherein a trackable coating is present on a surface of the post, wherein the device has an internal housing that is a cavity that extends downwardly from an upper surface of the base, and wherein the base is integrally formed with the second end of the post.

14. A foreign material exclusion device, comprising;
    a resilient body;
    a post having a first end and a second end connected together by a post connector, wherein a base is integrally connected to the second end of the post and includes an outwardly extending flange adapted to contact one end of the body, with the body being operatively connected to the second end of the post, wherein the post connector includes a female fitting connected to the first end or the second end with a male connector being connected to the other end.

15. The foreign material exclusion device according to claim 14, wherein the post includes a first eyelet that has a first end and a second end, the first end being located further away from the body and being narrower in width than the second end.

16. The foreign material exclusion device according to claim 15, wherein the post includes a second eyelet of a fixed size extending through the post from a first side to a second side, with a perimeter of the second eyelet bounded by post material.

17. The foreign material exclusion device according to claim 16, wherein a trackable coating is present in one or more of a cavity located on a tip of the post and one of the eyelets of the post.

18. The foreign material exclusion device according to claim 17, wherein the base includes an internal housing adapted to hold one or more of a sensor and an electronic tracking system.

19. The foreign material exclusion device according to claim 18, wherein the internal housing is a cavity that extends downwardly from an upper surface of the base, and wherein the base is integrally formed with the second end of the post.

20. A foreign material exclusion device, comprising:
a resilient body;
a post having a first end and a second end with the post extending through the body, with the body operatively connected between the ends, the first end of the post including a first eyelet of a fixed size extending through the post from a first side to a second side, with a perimeter of the first eyelet bounded by post material, wherein the post includes a post connector that connects the first end of the post to the second end, wherein the post includes a second eyelet of a fixed size extending through the post from a first side to a second side, with a perimeter of the second eyelet bounded by post material.

* * * * *